United States Patent [19]
Rhodes

[11] 3,772,592
[45] Nov. 13, 1973

[54] APPARATUS FOR MEASURING ELECTROSTATIC FIELDS

[76] Inventor: William A. Rhodes, 4421 N. 13th Pl., Phoenix, Ariz. 85014

[22] Filed: June 30, 1972

[21] Appl. No.: 268,213

[52] U.S. Cl. .................. 324/32, 324/72, 324/111
[51] Int. Cl. .................... G01r 5/28, G01r 29/12
[58] Field of Search ............... 324/32, 72, 111, 324/118

[56] References Cited
UNITED STATES PATENTS
2,993,165  7/1961  Jauch ............................ 324/32
3,611,127  10/1971  Vosteen ........................ 324/72

Primary Examiner—Rudolph V. Rolinec
Attorney—Warren F. B. Lindsley

[57] ABSTRACT

A rectifier, skip-cycle converter synchronized with an A. C. line, a phase sensitive bridge and a capacitor having a rapidly changing value of capacitance for providing an inexpensive and highly sensitive apparatus for measuring the strength and polarity of electrostatic fields.

6 Claims, 3 Drawing Figures

PATENTED NOV 13 1973
3,772,592
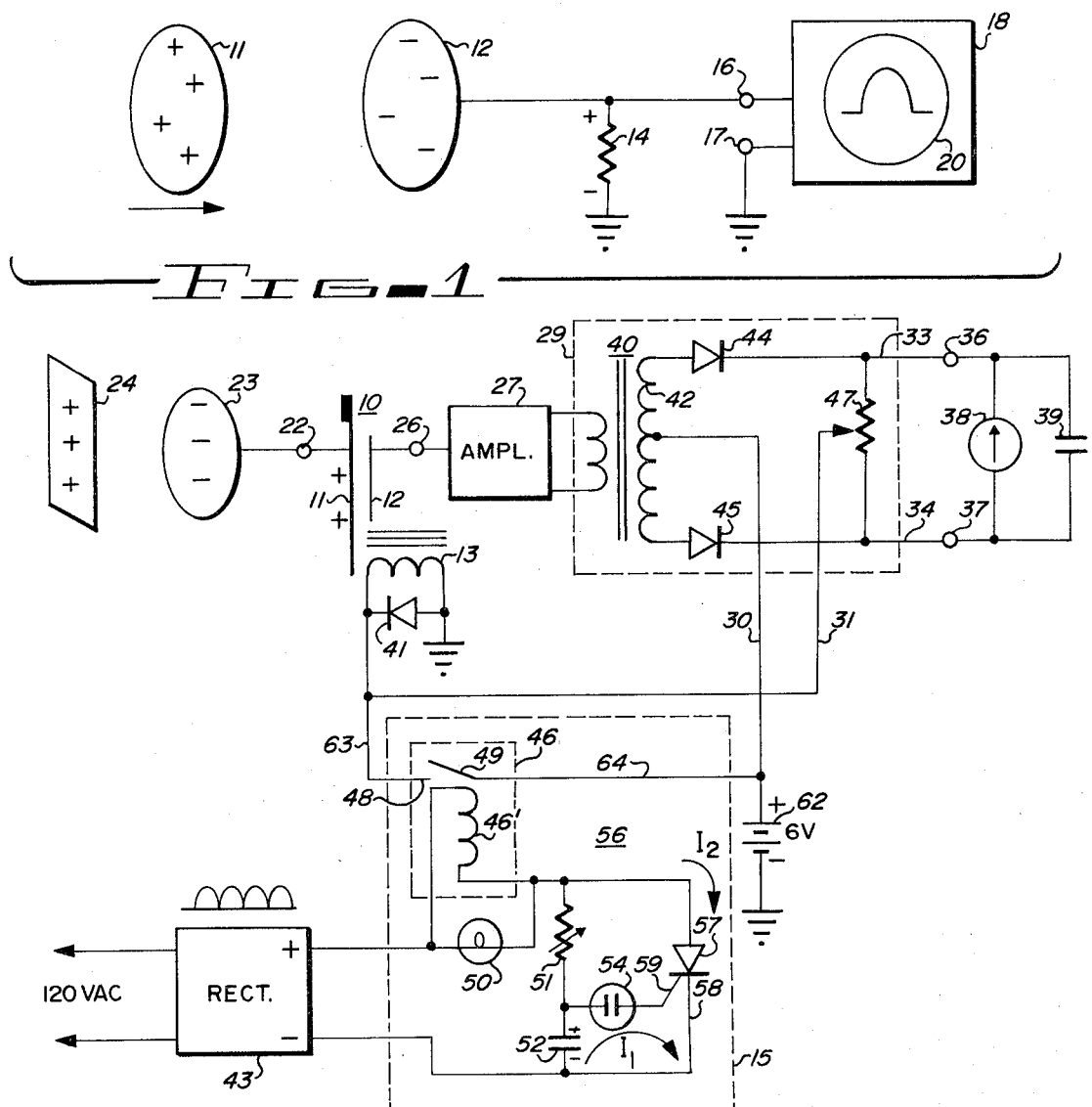
Fig-1
Fig-2
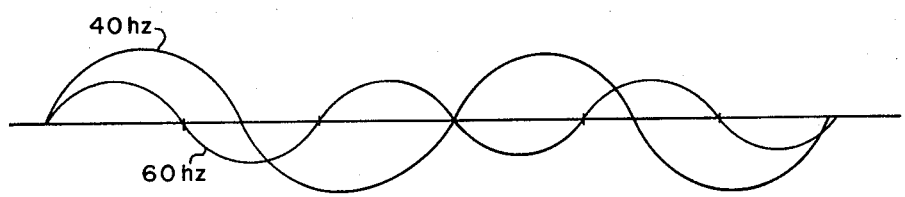
Fig-3

APPARATUS FOR MEASURING ELECTROSTATIC FIELDS

BACKGROUND OF THE INVENTION

This invention relates to apparatus for measuring electrostatic fields and more particularly to an inexpensive and highly sensitive apparatus which is relatively unaffected by stray fields caused by A. C. power lines.

There have been many attempts to develop apparatus for measuring the value and polarity of the D. C. potential of a source without "loading" or removing an electrical charge from the source. Prior art devices have been either expensive to construct or have been inaccurate because of stray electric fields caused by A. C. power lines which are present in many locations where it is desired that the potential of an unknown source or field be measured. Other prior art devices are relatively insensitive and develop noise signals which may affect the accuracy of the readings.

The present invention alleviates the disadvantages of the prior art by providing an inexpensive apparatus which measures minute values of potential without using an electrical current from the source of potential being measured. The present invention has means for greatly reducing the effects of any stray electric fields caused by A. C. power lines and accurately measures the amplitude and polarity of an electrostatic field or the potential of a D. C. source.

It is, therefore, an object of this invention to provide a new and improved apparatus for measuring electrostatic fields.

Another object of this invention is to provide apparatus having increased sensitivity over prior art apparatus for measuring electrostatic fields.

A further object of this invention is to provide an inexpensive apparatus for measuring electrostatic fields.

Still another object of this invention is to provide apparatus having reduced sensitivity to interference from the A. C. power lines.

A still further object of this invention is to provide apparatus for measuring the strength and polarity of electrical potentials without changing the value of the potential being read.

Further objects and advantages of the invention will become apparent as the following description proceeds and the features of novelty which characterize this invention will be pointed out with particularity in the claims annexed to and forming part of this specification.

SUMMARY OF THE INVENTION

The foregoing objects are achieved in the present invention by using a skip-cycle converter to cause a capacitor to have a rapidly varying value of capacitance. A means is provided to synchronize the converter with the A. C. power lines at a frequency which is different than the frequency of the power lines. This provides stable detection of the potential being measured, but prevents interference by the power line field.

BRIEF DESCRIPTION OF THE DRAWINGS

FIG. 1 is a diagram of a simplified apparatus which illustrates the principle of the present invention;

FIG. 2 is a diagram of one embodiment of the present invention; and

FIG. 3 illustrates waveforms which are useful in explaining the operation of the present invention.

DESCRIPTION OF THE PREFERRED EMBODIMENT

The basic principle of operation of the present invention can be seen by referring to the diagram of FIG. 1. When a first plate 11 is supplied with an electrostatic charge and moved toward a second plate 12 the opposite type of charge is attracted to the second plate. For example, when a positive charge is placed on plate 11 and plate 11 is moved toward plate 12 electrons from ground are attracted so they flow through resistor 14 to plate 12. Electrons flowing through resistor 14 provide a voltage drop of the polarity shown across resistor 14 so that a positive voltage is applied to signal input terminal 16 of terminals 16 and 17 of oscilloscope 18. This positive voltage on terminal 16 causes an upward deflection of the electron beam on the face of the oscilloscope screen 20. When the charged plate 11 is moved toward the left, electrons which were previously attracted to plate 12 are repelled by each other so that electrons flow from plate 12 through resistor 14 to ground. Electrons flowing to ground provide a negative polarity at the upper end of resistor 14. The negative polarity at the upper end of resistor 14 and on terminal 16 cause a downward deflection of the electron beam on the face of the oscilloscope screen 20.

The amount of deflection of the electron beam on the oscilloscope is determined by the value of the charge on plate 11, by the speed at which plate 11 is moved toward or away from plate 12 and by the distance between plate 11 and 12. The value of the charge on plate 11 is determined by the area of the plates 11 and 12. As the area of the plates increases the value of the charge increases and provides a greater amount of deflection on the oscilloscope. When it is desired to make an an accurate comparison of the values of the charge on plate 11 at two different times the speed of movement of plate 11 and the distance between plates is made to be identical each time. Then the only variable which determines the amount of deflection of the beam on the oscilloscope is the value of the charge on plate 11. FIG. 2 shows one embodiment of the present invention which does this.

The apparatus for measuring electrical potential shown in FIG. 2 includes a first capacitor 10 having first and second plates 11 and 12 and an electromagnet 13. Plate 12 is fixed while plate 11 is caused to vibrate in relation to plate 12 by an A. C. potential which is generated by a converter 15. A signal input terminal 22 is connected to a probe or sheet 23 of conductive material. The sheet 23 can be positioned near a charged object so that a charge of the opposite polarity will be induced on sheet 23 which will provide a charge on plate 11 of the capacitor. In the example shown in FIG. 2 a positive charge on object 24 attracts electrons which flow from plate 11 to sheet 23 leaving a positive charge on plate 11. As plate 11 moves back and forth in relation to plate 12 a positive voltage is provided on terminal 26 of amplifier 27 when plate 11 moves toward plate 12 and a negative voltage is provided on terminal 26 when plate 11 moves away from plate 12. This is explained above in connection with FIG. 1.

The alternating polarity of voltage on input terminal 26 is amplified by amplifier 27 and coupled to a phase sensitive bridge 29. Input lead 30 of bridge 29 is connected to the positive terminal of a battery 62. Input lead 31 of bridge 29 is connected to the output lead 63 of converter 15. Output leads 33 and 34 of the bridge may be connected to input terminals 36 and 37 of a recording means such as a meter 38 shown in FIG. 2 or the oscilloscope 18 shown in FIG. 1. The theory of operation of the phase sensitive bridge is described in textbooks including Electronics for Communication Engineers by J. F. Graham, McGraw-Hill 1952 on page 279. The phase of the signal on output leads 33 and 34 can be determined by the position of the arm of potentiometer 47. For example, the arm may be set so there is no signal on leads 33 and 34 when there is no charge on object 24 and will provide an upward deflection on an oscilloscope when the charge on object 24 is positive and a downward deflection when the charge is negative. The signal from the secondary winding 42 of transformer 40 is rectified by diodes 44 and 45.

The present invention shown in FIG. 2 also can be used to measure relatively low values of voltage from source having high or low values of internal resistance. The sheet 23 may be disconnected from terminal 22 and the source of unknown voltage connected between terminal 22 and ground. Values of voltage in the order of millivolts can be accurately measured. The source of unknown voltage provides a small quantity of charge on plate 11, the source can then be removed and the oscilloscope or other measuring device will continue to record the value of the voltage from the source for an indefinite period of time. Since there is no connection between plate 11 and ground the charge may remain on plate 11 for many hours. This apparatus is especially valuable in measuring voltages in solid state circuitry where the voltage may be in the millivolt range and where internal impedances may be relatively large or small.

The operation of the skip-cycle converter 15 and the preferred method of preventing 60 hz (Hertz-unit of frequency of 1 cycle per second) interference will now be described in connection with FIGS. 2 and 3. If a 60 hz source or a 120 hz source or a submultiple of 60 hz were used to directly provide a voltage for the electromagnet 13, the 60 hz power lines nearby would cause an incorrect reading on the meter 38. For example, if one phase of a 60 hz radiation from a power line is coupled to sheet 23 an alternating charge is induced on sheet 23. This alternating charge will either be in phase with the motion of plate 11 when driven by 60 hz or it will be 180° out of phase with the driving voltage. By in phase, it is meant that the induced charge on sheet 23 is increasing as the plate 11 approaches plate 12 and out of phase means that the induced charge on sheet 23 is decreasing as plate 11 approaches plate 12. If the two are in phase the voltage to amplifier 27 will be larger than the correct value and the meter 38 will read higher than the correct value.

When a driving voltage of 40 hz is provided to electromagnet 13 the effect of voltage caused by 60 hz radiation is cancelled as seen in FIG. 3. It will be seen that 50 percent of the time the 60 hz signal of FIG. 3 will add to the 40 hz signal to increase the total signal and 50 percent of the time the 60 hz signal will subtract from the 40 hz signal. This causes a 20 hz increase and decrease in total signal which the needle of meter 38 is not able to reproduce due to the mass of the deflection portion of meter 38. This 20 hz signal can also be removed by placing capacitor 39 across the meter 38. A converter 15 using several other frequencies such as 80 hz could also be used to obtain similar results. However, it is more difficult to synchronize an 80 hz converter with the regular 60 hz power source available in most parts of the U. S. A. A converter using frequencies much higher than 60 hz can be used to eliminate the interference by 60 hz radiation. However, when higher frequencies are used the area of the vibrating plate 11 of the capacitor must be greatly reduced in order to resonate. When the area of plate 11 is reduced the value of the voltage at input terminal 26 of the amplifier is reduced so that an expensive amplifying system 27 must be used to provide a usable signal to bridge 29. Such a system would need to contain resonant signal peaking circuitry and also adequate positive feedback in order to enhance and adequately amplify the weak signal created at plate 11.

When converter 15 develops 40 hz it can be easily synchronized with the available power source by using a full-wave rectifier 43. The output voltage from rectifier 43 has 120 half-wave pulses per second of the type shown near rectifier 43. Each pulse causes a current to flow from the positive output lead of rectifier 43, through lamp 50 and variable resistor 51 to the upper plate of capacitor 52, from the lower plate of capacitor 52 to the negative output lead of rectifier 43. The values of capacitor 52 and resistor 51 are selected so that three pulses from rectifier 43 charge capacitor 52 to a value of voltage so that neon bulb 54 is rendered conductive. When bulb 54 conducts a current $I_1$ flows from the upper plate of capacitor 52, through neon bulb 54, from gate 59 to cathode 58 of silicon controlled rectifier 56. Current $I_1$ renders silicon controlled rectifier 56 conductive so that a current $I_2$ flows from the positive lead of rectifier 43 through relay coil 46', from anode 57 to cathode 58 of silicon controlled rectifier 56. Current $I_2$ causes relay 46 to be energized so that the movable contact 49 of the relay switch closes against fixed contact 48. When the relay switch is closed battery 62 is connected to the electromagnet 13 thereby energizing the electromagnet and causing plate 11 of capacitor 10 to move toward plate 12.

The silicon controlled rectifier is a semiconductive device having an anode, a cathode and a gate. The silicon controlled rectifier can be used as an ON-Off switch which can be turned on in a very few microseconds. Normally the silicon controlled rectifier can not conduct current between anode and cathode thereof until a pulse of current larger than a threshold value flows from gate to cathode. If a positive voltage difference exists between the anode and the cathode when the pulse of current flows in the gate, the silicon controlled rectifier "fires;" i.e., is rendered conductive, and a current will flow from the anode to the cathode. Once anode-cathode flow commences, the gate has no further control over such current flow. Current flow from anode to cathode in the rectifier can be terminated only by reducing the anode to cathode current below a minimum current value.

The value of resistor 51 can be adjusted so that silicon controlled rectifier 56 conducts on every third pulse from rectifier 43. The converter is accurately synchronized with the A. C. power source and operates at 40 hz when the power source is 60 hz. The resistance of relay coil 46' is too large to provide the normal turn-on current for silicon controlled rectifier 56 so lamp bulb 50 is connected in parallel with coil 46 to create an adequate load and force rectifier 56 to trigger. Diode 41 prevents the electromagnet 13 from oscillating. A "diac" can be used to replace the neon bulb 54.

This converter while the simplest and most economical, is by no means the only system applicable for this purpose and wave shape of its output is not critical. The requirements are only that energy flows to the coil of electromagnet 13 for a long enough time to guarantee that plate 11 be pulled as close as possible toward plate 12 and also that each following pulse period is spaced in time at the resonant frequency of plate 11.

Frequencies of other than resonant period with plate 11 may be used and will produce a usable reading at meter 38 but with much attenuation to said reading due to smaller travel of plate 11 and/or harmonic motion of plate 11 at other than resonant frequency. Other power line frequencies can be utilized with equal success to supply the converter for so long as conversion is in the same proportion as derived from 60 hz.

While the principles of the invention have been made clear in an illustrative embodiment, there will be many obvious modifications of the structure, proportions, materials and components without departing from those principles. The appended claims are intended to cover any such modifications.

What is claimed is:

1. Apparatus for measuring electrostatic fields, for use with an alternating current source, said apparatus comprising:
   a skip-cycle converter;
   means for synchronizing said converter with said source, said means for sychronizing being connected between said converter and said source;
   a first capacitor having first and second plates, said first plate being movable, said second plate being fixed;
   a signal input terminal, said terminal being connected to said first plate of said first capacitor;
   an electromagnet having a coil, said coil of said electromagnet being coupled to said converter, said electromagnet being mounted adjacent said first plate of said first capacitor, said electromagnet causing the value of capacitance of said first capacitor to vary by varying the distance between said first and said second plates; and
   recording means, said recording means being coupled to said second plate of said first capacitor.

2. Apparatus for measuring electrostatic fields as defined in claim 1 wherein said means for synchronizing includes:
   a full-wave rectifier having first and second output leads, said full-wave rectifier being coupled to said A. C. source, said first and said second output leads of said full-wave rectifier being connected to said converter.

3. Apparatus for measuring electrostatic fields as defined in claim 1 including:
   a phase sensitive bridge having first and second input leads and first and second output leads; and
   means for coupling said bridge to said second plate of said capacitor, said first and said second input leads of said bridge being coupled to a converter, said first and said second output leads of said bridge being connected to a recording means.

4. Apparatus for measuring electrostatic fields as defined in claim 1 including:
   a phase sensitive bridge having first and second input leads and first and second output leads; and
   amplifying means, said amplifying means being connected between said bridge and said second plate of said capacitor, said first and said second input leads of said bridge being coupled to said converter, said first and said second output leads of said bridge being connected to said recording means.

5. Apparatus for measuring electrostatic fields as defined in claim 2 wherein said converter includes:
   a silicon controlled rectifier having an anode, a cathode and a gate;
   a second capacitor;
   a resistor, said second capacitor being connected between said cathode of said controlled rectifier and a first end of said resistor, a second end of said resistor being connected to said anode of said controlled rectifier;
   a neon bulb, said bulb being connected between said gate of said controlled rectifier and said first end of said resistor; and
   a relay having a coil and a pair of contacts, said coil of said relay being connected between said anode of said controlled rectifier and said first output lead of said full-wave rectifier, said cathode of said controlled rectifier being connected to said second output lead of said full-wave rectifier.

6. Apparatus for measuring electrostatic fields as defined in claim 4 wherein said means for synchronizing includes:
   a full-wave rectifier having first and second output leads, said full-wave rectifier being coupled to said source, and wherein said converter includes:
   a silicon controlled rectifier having an anode, a cathode and a gate;
   a second capacitor;
   a resistor, said second capacitor being connected between said cathode of said controlled rectifier and a first end of said resistor, a second end of said resistor being connected to said anode of said controlled rectifier;
   a neon bulb, said bulb being connected between said gate of said controlled rectifier and said first end of said resistor;
   a relay having a coil and a pair of contacts, said coil of said relay being connected between said anode of said controlled rectifier and said first output lead of said full-wave rectifier, said cathode of said controlled rectifier being connected to said second output lead of said full-wave rectifier; and
   a battery having first and second terminals, said pair of contacts of said relay being connected between said first terminal of said battery and a first end of said coil of said electromagnet, a second end of said coil of said electromagnet being connected to said second terminal of said battery, said first end of said coil of said electromagnet being connected to said first input lead of said phase sensitive bridge, said second input lead of said phase sensitive bridge being connected to said first terminal of said battery.

* * * * *